US012614031B1

(12) United States Patent
Ben Shoham et al.

(10) Patent No.: US 12,614,031 B1
(45) Date of Patent: Apr. 28, 2026

(54) INCREMENTAL CONTEXT COMPOSITION FOR LATENCY REDUCTION IN LANGUAGE PROCESSING MACHINE LEARNING MODELS

(71) Applicant: INTUIT INC., Mountain View, CA (US)

(72) Inventors: Ofir Ben Shoham, Giv'atayim (IL); Sagiv Antebi, Tel Aviv (IL); Matan Vetzler, 'Givat Shmuel (IL); Shai Ardazi, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/375,413

(22) Filed: Oct. 31, 2025

(51) Int. Cl.
G06F 40/279 (2020.01)
G06F 16/353 (2025.01)
G06F 40/166 (2020.01)

(52) U.S. Cl.
CPC .......... G06F 40/279 (2020.01); G06F 16/353 (2019.01); G06F 40/166 (2020.01)

(58) Field of Classification Search
CPC ..... G06F 40/279; G06F 16/353; G06F 40/166
See application file for complete search history.

(56) References Cited

U.S. PATENT DOCUMENTS

| | | | |
|---|---|---|---|
| 12,399,923 B1 * | 8/2025 | Nataneli | ............. G06F 16/3347 |
| 2022/0309089 A1 * | 9/2022 | Sutherland | ............ G06F 16/353 |
| 2025/0356141 A1 * | 11/2025 | Chen | .................... G06N 3/0475 |

* cited by examiner

*Primary Examiner* — Abul K Azad
(74) *Attorney, Agent, or Firm* — Patterson + Sheridan, LLP

(57) ABSTRACT

Aspects of the present disclosure involve reducing latency in generating responses using a large language model (LLM). Aspects include applying a sentence boundary detection technique to an input buffer in order to identify a first sentence in input text while the input text is being input. Aspects include using an encoder portion of the LLM to generate a first embedding of the first sentence. Aspects include determining that a final sentence has been entered in the input text. Aspects include using the encoder portion of the LLM to generate a second embedding of the final sentence. Aspects include generating a cumulative context vector using a merging machine learning model based on the first embedding and the second embedding. Aspects include injecting the cumulative context vector into a decoder portion of the LLM. Aspects include receiving a response to the input text from the LLM based on the cumulative context vector.

20 Claims, 6 Drawing Sheets

100

SERVER 110

DYNAMIC RESPONSE ENGINE 112

SENTENCE BOUNDARY DETECTION ENGINE 114

LANGUAGE PROCESSING MACHINE LEARNING MODEL 116

MERGING MACHINE LEARNING MODEL 118

INPUT TEXT
124

NETWORK
150

RESPONSE
126

CLIENT 120

USER INTERFACE
122

200

SENTENCE BOUNDARY DETECTION ENGINE 114

INPUT TEXT
124

BOUNDARY
DETECTION
ALGORITHM
202

SENTENCES
204

300

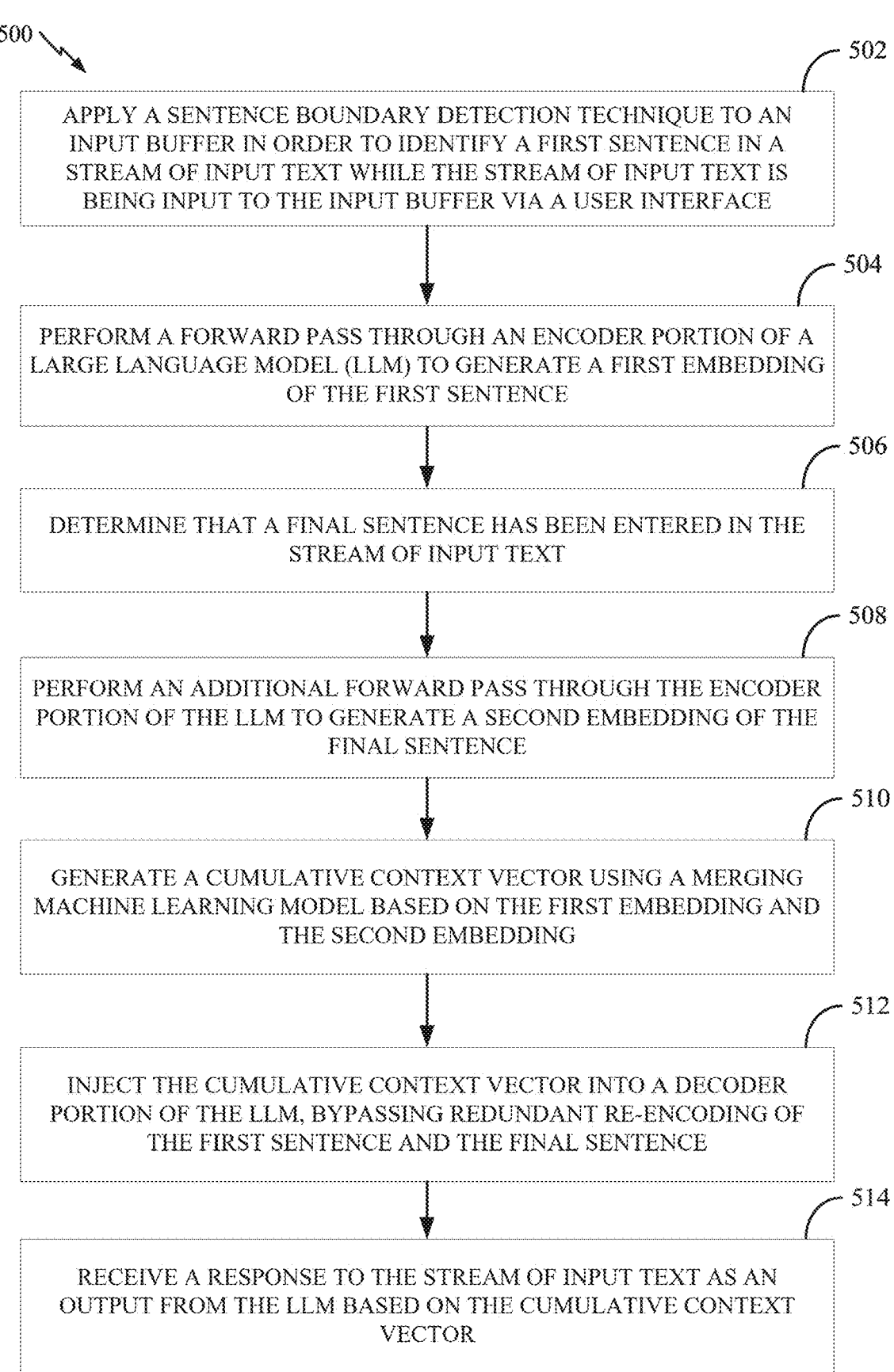

500

502

APPLY A SENTENCE BOUNDARY DETECTION TECHNIQUE TO AN INPUT BUFFER IN ORDER TO IDENTIFY A FIRST SENTENCE IN A STREAM OF INPUT TEXT WHILE THE STREAM OF INPUT TEXT IS BEING INPUT TO THE INPUT BUFFER VIA A USER INTERFACE

504

PERFORM A FORWARD PASS THROUGH AN ENCODER PORTION OF A LARGE LANGUAGE MODEL (LLM) TO GENERATE A FIRST EMBEDDING OF THE FIRST SENTENCE

506

DETERMINE THAT A FINAL SENTENCE HAS BEEN ENTERED IN THE STREAM OF INPUT TEXT

508

PERFORM AN ADDITIONAL FORWARD PASS THROUGH THE ENCODER PORTION OF THE LLM TO GENERATE A SECOND EMBEDDING OF THE FINAL SENTENCE

510

GENERATE A CUMULATIVE CONTEXT VECTOR USING A MERGING MACHINE LEARNING MODEL BASED ON THE FIRST EMBEDDING AND THE SECOND EMBEDDING

512

INJECT THE CUMULATIVE CONTEXT VECTOR INTO A DECODER PORTION OF THE LLM, BYPASSING REDUNDANT RE-ENCODING OF THE FIRST SENTENCE AND THE FINAL SENTENCE

514

RECEIVE A RESPONSE TO THE STREAM OF INPUT TEXT AS AN OUTPUT FROM THE LLM BASED ON THE CUMULATIVE CONTEXT VECTOR

FIG. 5

INCREMENTAL CONTEXT COMPOSITION FOR LATENCY REDUCTION IN LANGUAGE PROCESSING MACHINE LEARNING MODELS

INTRODUCTION

Aspects of the present disclosure relate to incremental context composition for reducing latency in the use of language processing machine learning models, and more particularly to a method and system for generating embeddings of input text in an incremental manner while the text is being entered to reduce resource utilization and time when generating a response to the input text using a language processing machine learning model.

BACKGROUND

Language processing machine learning models such as large language models (LLMs) have become highly prevalent components in modern computing applications, enabling advanced capabilities such as conversational agents, automated text generation, and intelligent search. These models typically require substantial computational resources to process user input and generate responses, especially as the complexity and length of the input text increases. Conventional techniques involve waiting until the user has finished entering the entire input before initiating use of the language processing machine learning model to process the input, resulting in a period of idle computation (e.g., while the user is typing).

Conventional approaches can lead to significant latency between the completion of user input and the delivery of an automatically generated response, which may negatively impact computing performance and user experience in interactive applications. The delay is particularly pronounced in scenarios where users provide lengthy or multi-sentence prompts, as processing such inputs using the model is resource intensive and time consuming.

Existing techniques for reducing latency in LLM-based systems have focused primarily on optimizing model architecture, hardware acceleration, or parallelization of inference tasks. However, these approaches do not address the fundamental bottleneck created by the need to wait for complete user input before beginning processing. As a result, there remains a need for improved methods and systems that can minimize response latency and enhance efficiency of LLM-driven applications, particularly in real-time and interactive environments.

BRIEF SUMMARY

According to an aspect of the present disclosure, a method for reducing latency in generating responses using a large language model (LLM) is provided. The method may include: applying a sentence boundary detection technique to an input buffer in order to identify a first sentence in a stream of input text while the stream of input text is being input to the input buffer via a user interface; performing a forward pass through an encoder portion of the LLM to generate a first embedding of the first sentence; determining that a final sentence has been entered in the stream of input text; performing an additional forward pass through the encoder portion of the LLM to generate a second embedding of the final sentence; generating a cumulative context vector using a merging machine learning model based on the first embedding and the second embedding; and injecting the cumulative context vector into a decoder portion of the LLM, bypassing redundant re-encoding of the first sentence and the final sentence; and receiving a response to the stream of input text as an output from the LLM based on the cumulative context vector.

According to other aspects, a non-transitory computer readable medium may store instructions that, when executed by one or more processors of a computing system, cause the computing system to perform one or more of the methods set forth above. According to other aspects, a system includes one or more processors and a memory storing instructions that, when executed by the one or more processors, cause the system to perform aspects of the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 5 illustrates a flowchart of operations related to reducing latency in generating responses using an LLM, according to aspects of the present disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
FIG. 1 illustrates a block diagram of a computing environment for reducing latency in generating responses using a large language model (LLM), according to aspects of the present disclosure.

The present disclosure relates to a method and system for reducing latency in generating responses using a language process machine learning model such as a large language model (LLM). Aspects of the present disclosure that are described with respect to LLMs can also be performed for other types of language processing machine learning models, such as small language models.

The techniques described herein introduce a novel approach for reducing latency in generating responses from language processing machine learning models by incrementally encoding user input as it is entered. Unlike conventional systems, which wait for the user to finish typing the entire input text before processing the input text using the model, the present solution segments the input text into sentences in real time. Each completed sentence, upon being detected as a discrete sentence, may be immediately encoded using an encoder portion of the LLM to produce an embedding, and each successive embedding may be merged into a cumulative context vector using a lightweight, learned merging machine learning model. When the final sentence in the input text is detected, that individual sentence may be encoded and merged into the cumulative context vector, and the cumulative context vector may then be injected into a decoder portion of the LLM (bypassing the encoder portion), allowing the system to bypass redundant re-encoding and deliver a response with significantly reduced end-to-end latency.

In contrast to prior techniques, such as encoder-only incremental transformers and simultaneous inference methods, the present solution is specifically designed for LLMs and leverages both incremental encoding and learned context merging for improved latency reduction. Encoder-only incremental transformers process only newly added tokens but are limited to encoder-only models and do not support the full capabilities of LLMs. Simultaneous inference approaches begin generating responses on incomplete input to overlap inference with user typing, but do not perform incremental encoding or context merging. The techniques described herein uniquely combine sentence-level segmentation, per-sentence encoding, and a neural context merge model to enable efficient context accumulation and response generation with reduced latency in a manner that is tailored for LLM architectures and that makes use of otherwise idle processing time (e.g., while the user is typing) for incremental encoding while only processing the input text using the decoder portion of the model once (e.g., after the final version of the incremental context vector has been generated for the input text).

Aspects of the present disclosure accomplish a number of technical improvements. For example, techniques described herein result in a substantial reduction in response latency, more efficient utilization of computational resources, improved computing performance, and enhanced scalability for applications that utilize language processing machine learning models (e.g., particularly for real-time applications such as conversational agents). By incrementally updating the context vector and injecting it directly into the decoder layers of the LLM after the final sentence in the user input has been entered, the system makes use of otherwise idle processing time while eliminating redundant processing, and enables fast and resource-efficient response generation upon completion of user input. This approach not only streamlines the application performance and the user experience, but also reduces the computational burden on the underlying hardware, making it possible to support more responsive and resource-efficient natural language computing interfaces.

The techniques of the present disclosure differ fundamentally from the existing Incremental Transformer approach. Incremental Transformer is designed for encoder-only models and operates by processing only newly added tokens while attending to cached representations of previous tokens. While this reduces redundant computation for incremental text encoding, it is limited to models that do not include a decoder component and cannot be directly applied to large language models (LLMs) that require both encoding and decoding stages. In contrast, the present disclosure is specifically tailored for LLM architectures, enabling incremental encoding of sentences and merging their embeddings into a cumulative context vector, which is then injected into the decoder portion of the model. This approach not only supports the full capabilities of LLMs but also introduces a learned context merging function, allowing for efficient context accumulation and response generation that is not possible with encoder-only incremental techniques.

Furthermore, compared to the existing LiveMind technique, the present disclosure introduces a distinct method for latency reduction in LLM-based systems. LiveMind focuses on enabling LLMs to begin generating responses on incomplete user input, overlapping inference with user typing to minimize perceived latency. However, LiveMind does not perform incremental encoding or learned context merging; instead, it simply starts the decoding process before the input is complete. The technique described herein, by contrast, incrementally encodes each completed sentence and merges its representation into a cumulative context vector (e.g., using a lightweight neural network). Only after the final sentence is entered does the system inject the accumulated context into the decoder, ensuring that the response is efficiently generated based on the full and properly merged input. This method avoids premature response generation and redundant computation, resulting in more accurate and efficient output compared to the LiveMind approach.

Example Computing Components Related to Reducing Latency in Response Generation Using a Language Processing Machine Learning Model FIG. 1 illustrates a block diagram of a computing environment 100 related to reducing latency in generating responses using a language processing machine learning model. The computing environment 100 may include a server 110 and a client 120 connected via a network 150.

Server 110 may comprise one or more processors and a memory storing instructions. In some cases, server 110 may be an application server or other computing device that hosts a computing application accessed by one or more users, such as via user interface 122 on client 120.

The client 120 be a computing device by which a user interacts with a computing application, and may include a user interface 122 that enables such interaction. The client 120 may send input text 124 (e.g., incrementally, as input text 124 is entered at client 120) through the network 150 to the server 110, and may receive a response 126 back through the network 150 (e.g., after input text 124 has been completely entered). For example, input text 124 may be natural language text received via user interface 122, such as from a user interacting with user interface 122 (e.g., to provide input to and receive output from a conversational agent application such as a chatbot). Input text 124 may include a plurality of sentences, and may be provided to server 110 on an ongoing basis, such as when each new character of input text 124 is entered via user interface 122. In one example, input text 124 is a multi-sentence natural language prompt that includes a question, request, command, or the like.

Server 110 may generate response 126 through a process that involves automated processing of input text 124 (e.g., on an ongoing basis, as input text 124 is received) to identify individual sentences within input text 124, creating and incrementally updating a context vector based on each consecutive individual sentence in input text 124 (e.g., using an encoder portion of language processing machine learning model 116 and merging machine learning model 118), and generating a response to input text 124 based on the final context vector (e.g., using a decoder portion of language processing machine learning model 116).

Server 110 may contain a dynamic response engine 112 for processing of input text 124 and generating of response 126. Dynamic response engine 112 is configured to process input text 124 and generate response 126 by orchestrating the operation of several specialized components. Upon receiving each incremental portion of input text 124 (e.g., from user interface 122), dynamic response engine 112 may utilize a sentence boundary detection engine 114 to monitor and analyze the input buffer in real time. For example, sentence boundary detection engine 114 may identify sentence boundaries within the stream of input text (e.g., by detecting particular punctuation marks or by applying a trained classifier to predict the end of a sentence). For instance, a classifier can be trained to predict the end of a sentence by utilizing a labeled dataset containing examples of text with annotated sentence boundaries. Such a training process may involve extracting features from the example text, such as punctuation marks, word patterns, and contextual cues surrounding potential sentence endings. The classifier, which may be a lightweight neural network or another machine learning model, may be trained using supervised learning to distinguish between features in the extracted features that represent sentence boundaries and those that do not. For instance, the classifier may output indications of whether particular features indicate sentence boundaries, these outputs may be compared to the labels indicating whether the particular features actually indicate sentence boundaries, and parameters of the classifier may be iteratively adjusted based on the comparing (e.g., until the outputs from the model match the labels or some other condition is detected, such as relating to model accuracy). During training, the model learns to associate specific patterns and features with the likelihood of a sentence ending, enabling it to accurately predict sentence boundaries in real-time input streams. Once trained, the classifier can be deployed to monitor user input and trigger sentence segmentation as soon as a boundary is detected. Alternatively, sentence boundary detection may be based on rules, searching for particular characters or patterns, regular expressions, and/or the like.

Once a sentence boundary is detected, the identified sentence may be forwarded to an encoder portion of language processing machine learning model 116. The encoder portion of model 116 may perform a forward pass on the completed sentence, generating a corresponding sentence embedding. For the first detected sentence in input text 124, the generated embedding of that sentence may be used as an initial context vector. On each subsequent detected sentence after the first detected sentence, the encoder portion of language processing machine learning model 116 may be used to generate an embedding of the detected sentence and this embedding may be provided to a merging machine learning model 118 along with the prior version of the context vector, and merging machine learning model 118 may generate an incrementally updated cumulative context vector by combining the new sentence embedding with the context vector representing previously processed sentences.

As the user continues to input text, this process repeats for each completed sentence, with the cumulative context vector being updated in real time. When the final sentence in the input text 124 is detected, dynamic response engine 112 may encode the last sentence and merge its embedding with the existing context vector to produce a final context vector that represents the entirety of input text 124.

The final context vector may then be injected into the decoder portion of the language processing machine learning model 116, bypassing redundant re-encoding of previously processed sentences. For example, the final context vector may be fed directly into the decoder portion, starting at an intermediate layer of language processing machine learning model 116, thereby eliminating redundant re-computation of earlier encoder layers. The decoder portion may then be used to generate response 126 based on the full context accumulated from the user's input. For example, response 126 may be output by language processing machine learning model 116 based on processing the final context vector through the decoder portion of the model. Response 126 may then be transmitted back to client 120 for display via user interface 122, providing the user with a result that is based on the entire input text with reduced latency and improved computational efficiency as opposed to prior techniques (e.g., techniques that involve processing the entirety of an input text through the encoder and decoder portions of a language processing machine learning model after the input text is complete).

Response 126 may be displayed via user interface 122. For example, a user of client 120 may receive response 126 via user interface 122, and may take action based on response 126 as appropriate (e.g., to provide feedback with respect to response 126, provide subsequent input text, perform an action indicated in response 126, and/or the like). User feedback with respect to response 126 (e.g., indicating correctness or incorrectness of response 126) may be used to re-train language processing machine learning model 116 and/or merging machine learning model 118 (e.g., using input text 124 as a training input and response 126 as a label indicating a correct or incorrect response to input text 124 based on the feedback).

Language processing machine learning model 116 may be trained using supervised learning techniques on a large corpus of text data. The model may learn, by being exposed to large amounts of text sequences, to map input text to meaningful representations and generate appropriate outputs by adjusting its internal parameters to minimize prediction errors (e.g., for next token prediction).

The training process typically involves feeding batches of text data through the encoder and decoder portions of the model. The encoder transforms the input text into embeddings that capture semantic and syntactic information, while the decoder generates output sequences based on these embeddings. The model's outputs may be compared to ground truth data, and the comparison may be used to update the model weights using an optimization algorithm, such as stochastic gradient descent. In addition to general language modeling tasks, the model may be fine-tuned for specific applications, such as conversational response generation. Fine-tuning involves further training the model on domain-specific datasets, allowing it to adapt to particular language patterns, user intents, or contextual requirements.

For example, language processing machine learning model 116 may have been trained on a large training data set in order to process natural language inputs and generate natural language content in response. In some embodiments, language processing machine learning model 116 is a large language model (LLM), such as a generative pre-trained transformer (GPT) model, that has been trained on a large set of training data (e.g., across a plurality of domains), and is capable as a result of such training to perform a wide variety of language-related tasks in response to natural language prompts. In some embodiments, language processing machine learning model 116 has been fine-tuned for one or more particular domains, such as for use with a particular software application or for a specific purpose, while in other embodiments language processing machine learning model 116 has been trained in a more general fashion and has not been fine-tuned in such a manner. language processing machine learning model 116 may have a large number of tunable parameters, which are iteratively adjusted during a model training process based on training data. In alternative embodiments, language processing machine learning model

116 may be another type of machine learning model that is capable of generating content. For example, language processing machine learning model 116 may be a small language model, a generative adversarial network (GAN), an autoencoder model, an autoregressive model, a diffusion model, a Bayesian network, a hidden Markov model, and/or the like. In general, machine learning models such as LLMs are trained (and/or fine-tuned) by exposing the model to large datasets and iteratively adjusting internal parameters, such as to minimize an objective function. The objective function quantifies the difference between the model's predictions and the desired outputs (e.g., which may be indicated by labels in the training data or otherwise may be the target output of the model), guiding the optimization process to improve model performance over time.

Merging machine learning model 118 may be jointly trained with language processing machine learning model 116, or may be separately trained or fine-tuned. Merging machine learning model 118 learns to combine a sentence embedding with a prior cumulative embedding to produce an updated cumulative embedding in a way that preserves relevant information and supports accurate downstream response generation.

For example, merging machine learning model 118 may be trained to combine individual sentence embeddings with a prior cumulative context vector, producing an updated context representation that accurately reflects the entire input up to that point. The training process may involve supervised learning, where the merging model is exposed to pairs of sentence embeddings and cumulative context vectors. During training, merging machine learning model 118 may receive as input a sentence embedding and a prior context vector, and may be tasked with producing an updated context vector that preserves relevant semantic and syntactic information from both sources. The output from merging machine learning model 118 may then be used to generate a response using a decoder portion of language processing machine learning model 116, and that response may be compared with a label indicating a target response or verified response. Parameters of merging machine learning model 118 may then be adjusted through an optimization algorithm such as stochastic gradient descent based on the comparing of the response generated by the decoder portion of language processing machine learning model 116 to the label response. Thus, merging machine learning model 118 may be trained to optimize ultimate response accuracy such that the cumulative embeddings generated by merging machine learning model 118 are likely to result in highly accurate responses generated by language processing machine learning model 116. This is included as an example training process, and other training processes are possible, such as training merging machine learning model 118 independently of language processing machine learning model 116.

Merging machine learning model 118 may be implemented as a lightweight neural network, such as a multilayer perceptron (MLP) or a gated recurrent unit (GRU), which is capable of efficiently fusing the input vectors. In some cases, merging machine learning model 118 is jointly trained with the main language processing model, allowing both components to learn complementary representations that support accurate and efficient response generation. Alternatively, the merging model may be trained separately on a dataset of segmented sentences and corresponding target context vectors (e.g., generated based on the entirety of the input texts represented by the segmented sentences, and used as labels).

Through such a training process, merging machine learning model 118 learns to incrementally update the cumulative context vector in a way that supports high-quality, contextually appropriate responses from language processing machine learning model 116.

Overall, the training process or processes enables language processing machine learning model 116 (in conjunction with merging machine learning model 118), to develop robust representations of natural language and deliver high-quality, contextually appropriate responses in real-time applications.

Example Sentence Boundary Detection

Figure 2:
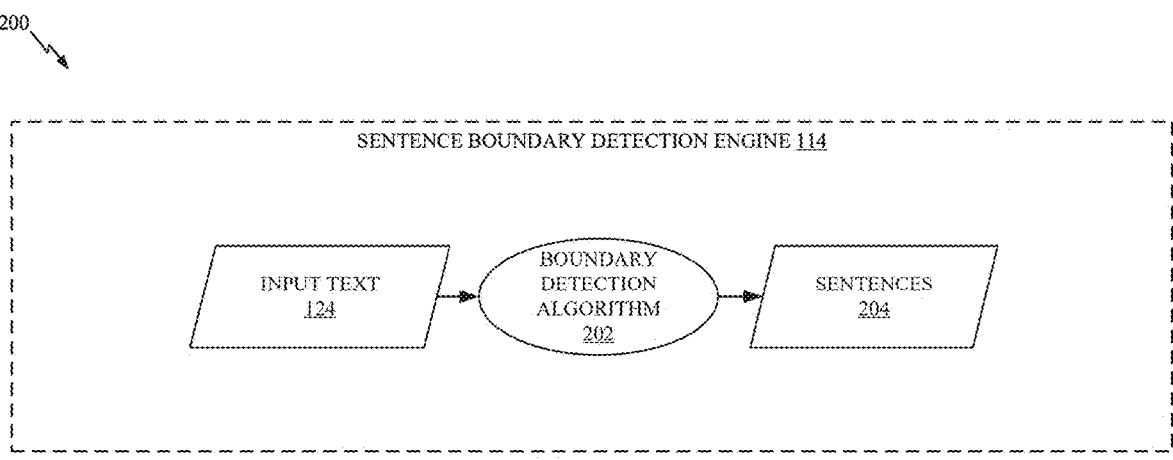
FIG. 2 is a block diagram illustrating a workflow related to sentence boundary detection for reducing latency in generating responses using an LLM, according to aspects of the present disclosure.

FIG. 2 is a block diagram 200 illustrating a workflow related to sentence boundary detection for reducing latency in generating responses using an LLM, according to aspects of the present disclosure. Block diagram 200 includes sentence boundary detection engine 114 and input text 124 of FIG. 1.

Sentence boundary detection engine 114 may be responsible for segmenting input text 124 into discrete sentences 204 (e.g., in real time, while input text 124 is being entered, such as being run each time a new character of input text 124 is entered). At the core of this process is a boundary detection algorithm 202, which receives the input text 124 and outputs identified sentences 204.

The boundary detection algorithm 202 can operate using a variety of different techniques, such as including rules-based techniques, a trained classifier, or the like. In a rules-based approach, boundary detection algorithm 202 may monitor input text 124 for specific sentence boundary indicators, such as periods, question marks, exclamation points, or newline characters. When such punctuation or patterns are detected, boundary detection algorithm 202 may mark the end of a sentence and segment the text accordingly.

In another example, boundary detection algorithm 202 can employ a trained machine learning model such as a classifier to predict sentence boundaries. This machine learning model may be a classification machine learning model that is trained on annotated text data and learns to recognize patterns and contextual cues that signal the end of a sentence, in some cases beyond simple punctuation. By analyzing features such as word usage, syntactic structure, and surrounding context, the machine learning model can accurately identify sentence boundaries even in cases where punctuation is ambiguous or absent.

A machine learning model used by boundary detection algorithm 202 may, for example, be trained using supervised learning techniques. For example, a dataset of text samples may be annotated to indicate the locations of sentence boundaries. Each training instance may include input text labeled to specify whether a given position represents the end of a sentence. During training, the model may be provided with input text and/or features derived from the input text, such as punctuation marks, word sequences, syntactic cues, and/or contextual information around candidate boundary positions. The model may be trained by receiving outputs from the model based on such training inputs, comparing the outputs to labels associated with the training inputs, and adjusting the model's internal parameters based on the comparing, such as to minimize the difference between the model's outputs and the true labels, such as using an optimization algorithm (e.g., stochastic gradient descent). This iterative process enables the model to learn patterns and associations that are indicative of sentence boundaries. A variety of different types of machine learning models may be used as the machine learning model, including a lightweight neural network such as a multi-layer perceptrons (MLP), a recurrent neural networks (RNN), or a gated recurrent units (GRU), a tree-based classification model such as a regression model, decision tree, random forest model, gradient boosted tree model, and/or the like. Such models are capable of capturing both local and sequential dependencies in the text, making them suitable for boundary detection tasks. In some cases, simpler models such as logistic regression or decision trees may be employed for efficiency, depending on the complexity of the application and the available computational resources.

In some aspects, a machine learning model used by boundary detection algorithm 202 may be a lightweight encoder model. Some sentence boundary detection techniques rely solely on rules, such as the presence of punctuation marks, to segment input text. However, these approaches may be insufficient in cases where punctuation is ambiguous, missing, or used in non-standard ways. By incorporating a lightweight encoder model trained to predict sentence boundaries directly from partial text, aspects of the present disclosure can leverage learned contextual and syntactic cues to improve segmentation accuracy. This may enable more reliable real-time processing of user input, enhancing the effectiveness and responsiveness of language model applications.

Conventional language processing systems typically wait until the user has finished entering the entire input before initiating any encoding or inference, resulting in a period of idle computation while the user is typing. Such existing approaches fails to utilize available computational resources during the input phase and contribute to increased response latency, particularly for lengthy or multi-sentence prompts. Thus, techniques described herein may monitor user keystrokes and punctuation in real time, enabling the detection of sentence boundaries as the user types. For example, boundary detection algorithm 202 may be applied as each new keystroke is detected in order to determine whether a sentence boundary has been reached. By triggering processing operations immediately upon the completion of each sentence based on keystroke-level monitoring and analysis, aspects of the present disclosure reduce idle time and improve overall responsiveness in interactive language model applications.

By integrating rules-based detection and/or a trained classifier, boundary detection algorithm 202 enables sentence boundary detection engine 114 to reliably segment input text 124 into sentences 204, supporting real-time incremental processing in language model applications.

Each of sentences 204 may be a discrete sentence that can be encoded using an encoder portion of language processing machine learning model 116 as described herein.

Example Workflow for Reducing Latency in LLM Response Generation

Figure 3:
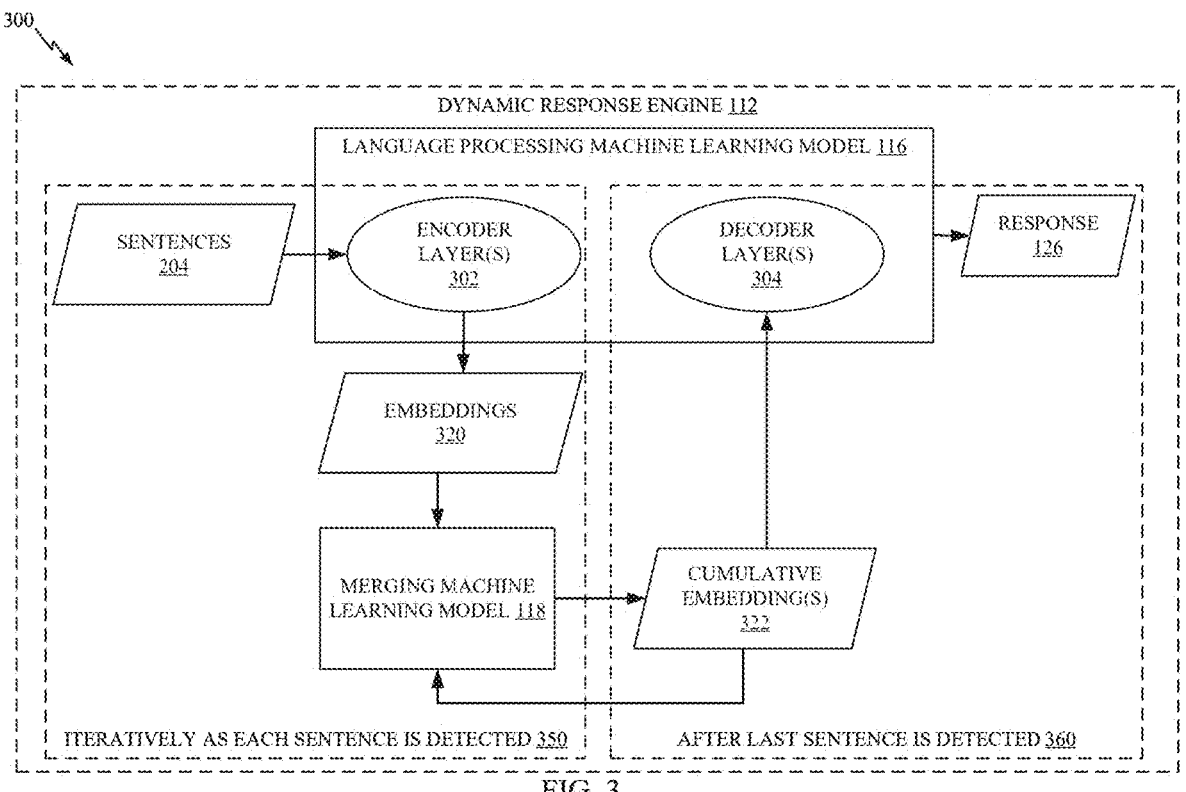
FIG. 3 is a block diagram illustrating a workflow related to reducing latency in generating responses using an LLM, according to aspects of the present disclosure.

FIG. 3 is a block diagram 300 illustrating a workflow related to reducing latency in generating responses using an LLM, according to aspects of the present disclosure. Illustration 300 includes dynamic response engine 112, language processing machine learning model 116, merging machine learning model 118, and response 126 of FIG. 1, and sentences 204 of FIG. 2. Block diagram 300 generally relates to incremental encoding of input text for improved efficiency and latency reduction. Sentences 204 may be determined using a sentence boundary detection technique based on input text as the input text is being entered, as described above with respect to FIG. 2.

Block diagram 300 shows how sentences 204 may be processed through the system, including through one or more encoder layers 302 and one or more decoder layers 304 of language processing machine learning model 116.

Encoder layer(s) 302 may represent an encoder portion of language processing machine learning model 116 that is configured to process input text and convert it into an embedding that captures the semantic and syntactic characteristics of the text. Decoder layer(s) 304 may represent a decoder portion of language processing machine learning model 116 that is configured to generate an output sequence, such as a natural language response, based on one or more embeddings. The decoder portion interprets an embedding vector and utilizes its own layer(s) and learned parameters to produce a coherent and contextually appropriate response.

A typical large language model (LLM), for example, includes an encoder portion and a decoder portion that generally work together to process and generate natural language. This division allows the LLM to efficiently process input and generate high-quality language outputs.

As each sentence 204 is detected in the input text, it may be passed (e.g., without necessarily waiting for a next sentence to be detected or for the input text to be complete) to encoder layer(s) 302 of language processing machine learning model 116. Encoder layer(s) 302 may generate a corresponding embedding 320 for each sentence 204. The embeddings 320 generated by encoder layer(s) 302 may not be processed by decoder layer(s) 304, and the process may not involve use of decoder layer(s) 304 until a final cumulative embedding 322 is generated after a final sentence 204 is detected.

For the first sentence 204, sequentially, of sentences 204, the embedding 320 of that sentence 204 may be used as the cumulative embedding of the input text up to that point. For the second sentence 204, sequentially, of sentences 204 (and each of one or more subsequent sentences 204, such as up to a last sentence 204), the embedding 320 of that sentence 204 may be provided to merging machine learning model 118 along with the most recent cumulative embedding (e.g., which may be the embedding 320 of the first sentence 204 or a latest cumulative embedding 322 generated using merging machine learning model 118). Merging machine learning model 118 may combine each new embedding 320 with the corresponding most recent cumulative embedding representing the context of previously processed sentences in order to produce an updated cumulative embedding 322.

This process may be performed iteratively as each sentence 204 is detected (as indicated by block 350). Each incremental cumulative context vector (e.g., each version of cumulative embedding 322 as it is incrementally updated) may be stored in a fast-access memory, such as random access memory (RAM), memory bank, or a dedicated cache, after it is generated by merging machine learning model 118. As each sentence in the input text is processed and its embedding is merged with the previous context vector (which may be efficiently retrieved from fast-access memory), the updated cumulative context vector may be written to a fast-access memory location that allows for rapid retrieval. This approach ensures that the most recent context representation is always available for subsequent processing steps, such as further merging with new sentence embeddings or for use in generating a final response, in a fast and resource-efficient manner. Storing the cumulative context vector in fast-access memory provides several benefits. For example, it enables efficient incremental updates, as the dynamic response engine 112 can quickly access the most recent context vector without incurring delays associated with slower storage media (e.g., persistent storage such as disk storage). Additionally, it supports real-time responsiveness, allowing the system to immediately process new input or user edits by retrieving and updating only the relevant portions of the context and efficiently retrieving the final cumulative context vector for use in efficient response generation. This design is particularly advantageous in interactive applications, where low latency and efficient resource utilization are critical for delivering a seamless user experience.

If the user edits a previously entered sentence before submitting the entire input text, the system may adapt by selectively regenerating an embedding of the affected sentence using the encoder portion of language processing machine learning model 116, and updating the cumulative context vector accordingly. For example, when such an edit is detected, dynamic response engine 112 may identify the specific sentence that has been modified and perform a forward pass through the encoder portion of language processing machine learning model 116 to generate a new embedding for the edited sentence. Dynamic response engine 112 may then retrieve the prior cumulative context vector that corresponds to the state immediately before the edited sentence (e.g., from fast-access memory, where each incremental version of the cumulative context vector may be stored, such as along with metadata indicating which sentence of the input text the version of the cumulative context vector is cumulative for). Using merging machine learning model 118, the newly generated embedding for the edited sentence may be merged with the prior cumulative context vector to produce an updated context vector. If the edit affects subsequent sentences that have already been processed in the input text, the system may continue this process, retrieving or generating embeddings of those subsequent sentences as appropriate and merging those embeddings sequentially with the latest cumulative context vector, thereby reconstructing an updated cumulative context vector up to the current point.

For example, intermediate context vectors (e.g., $c_1$, $c_2$, $c_3$) may be cached in fast-access memory, and may be used as appropriate to efficiently update only affected portions when a user edits a previous sentence (e.g., by starting with the intermediate context vector $c_i$ that represents the cumulative context just prior to the edited sentence and incrementally merging a newly generated embedding of the edited sentence and then embeddings of any subsequent sentences into the context vector).

This approach allows dynamic response engine 112 to efficiently update the context representation in the event of an edit to a previously processed sentence without reprocessing the entire input text. By leveraging fast-access memory to store intermediate context vectors and embeddings, the system can quickly retrieve and update only the necessary components, ensuring that the final cumulative context vector accurately reflects the user's latest input in a low-latency manner. This capability supports real-time responsiveness and maintains low latency, even when users make changes to previously entered text.

Some techniques for context merging may rely on simple concatenation or averaging of sentence embeddings, which can fail to capture the nuanced relationships between different parts of input text. These techniques may result in loss of important semantic or syntactic information, ultimately reducing the accuracy and relevance of generated responses. By utilizing a merging machine learning model, which may be a lightweight neural network, such as a multi-layer perceptron (MLP) or a gated recurrent unit (GRU), as a merge function, techniques described herein enable the system to learn to fuse new sentence embeddings with the cumulative context vector in a manner that preserves critical information and supports high-quality downstream response generation. In one example, the merge function $f_\phi$ used to merge or fuse an embedding with a prior cumulative context vector is a small neural network (e.g., a 2-layer MLP or GRU).

After the last sentence 204 in the input text is detected (as indicated by block 360), the final cumulative embedding 322 (e.g., representing the entire input text) is injected into decoder layer(s) 304 of language processing machine learning model 116. Decoder layer(s) 304 may then generate response 126 based on the final cumulative embedding 322, without any use of encoder layer(s) 302 after the embedding of the final sentence 204 is generated. For example, the only use of encoder layer(s) 302 for sentences 204 after detecting the final sentence 204 may be generating the embedding 320 of the final sentence 204.

The final sentence 204 may be detected based on one or more conditions, such as the user selecting a particular user interface control (e.g., to submit the input text), a user pressing a particular key or button (e.g., an enter key), detecting a particular word or phrase (e.g., that is configured to indicate completion of an input text, such as when the text is input via audio), and/or one or more other conditions (e.g., a certain amount of time elapsing since any input text was last received). In some aspects, the final cumulative context vector may be generated before it is determined that the final sentence has been entered (e.g., because a sentence boundary of the final sentence may be detected, and the final sentence may be encoded and merged into the cumulative context vector before the user clicks the submit button or a condition otherwise occurs indicating that the input text is complete), and detecting that the final sentence has been entered may trigger injecting of the latest cumulative context vector (which, in such a case, is the final cumulative context vector) into the decoder portion of the language processing machine learning model to generate the response. In other aspects, the final cumulative context vector may be generated after it is determined that the final sentence has been entered (e.g., if the user clicks submit or another applicable condition is detected before a sentence boundary of the final sentence is detected and/or before the final cumulative context vector has been generated based on the final sentence).

Block diagram 300 highlights the separation between the encoding and decoding stages, as well as the role of the merging machine learning model in efficiently updating the context representation. By processing sentences incrementally and merging their embeddings, the system is able to bypass redundant re-encoding and deliver a response with reduced latency.

In some aspects, the dynamic response generation process may be represented by the following pseudocode.

Algorithm 1 Incremental Encoding via Sentence Segmentation

Require: User input buffer U, initial context $c_0 \leftarrow 0$
while user is typing do
if boundary detected at tor lightweight fine-tuned predictor then
$S_t \leftarrow$ extract sentence from U
$h_t \leftarrow$ LLMEncode($S_t$)
$c_t \leftarrow f_\phi(h_t, c_{t-1})$
end if
end while
$c_T \leftarrow f_\phi$(LLMEncode($S_T$), $c_{T-1}$)
Generate response: LLMDecode($c_T$)

In the above pseudocode, the algorithm starts with a buffer U that collects the user's input as it is typed, and an initial context vector $c_0$ set to zero. The system then continuously monitors the input buffer as the user enters text. At each time step t, the system checks for a sentence boundary, either by detecting punctuation or by using a trained lightweight predictor.

When a boundary is detected, the completed sentence $S_t$ is extracted from the input buffer U. The extracted sentence $S_t$ is then encoded by the LLM's encoder, represented by LLMEncode($S_t$), producing a sentence embedding $h_t$. The new sentence embedding $h_t$ is merged with the previous context vector $c_{t-1}$ using a learned merge function $f_\phi$ (e.g., which may be merging machine learning model 118), resulting in an updated cumulative context vector $c_t$. The system continues to monitor for boundaries and process sentences as they are completed. The while loop continues until the user finishes typing the entire input.

After the final sentence $S_T$ is entered, it is encoded and merged with the last cumulative context vector $c_{T-1}$ to produce the final context vector $c_T$. The final context vector $c_T$ is fed into the LLM's decoder, which may be represented by LLMDecode($c_T$), to generate the system's response to the user's input.

Example User Interface Screen

Figure 4:
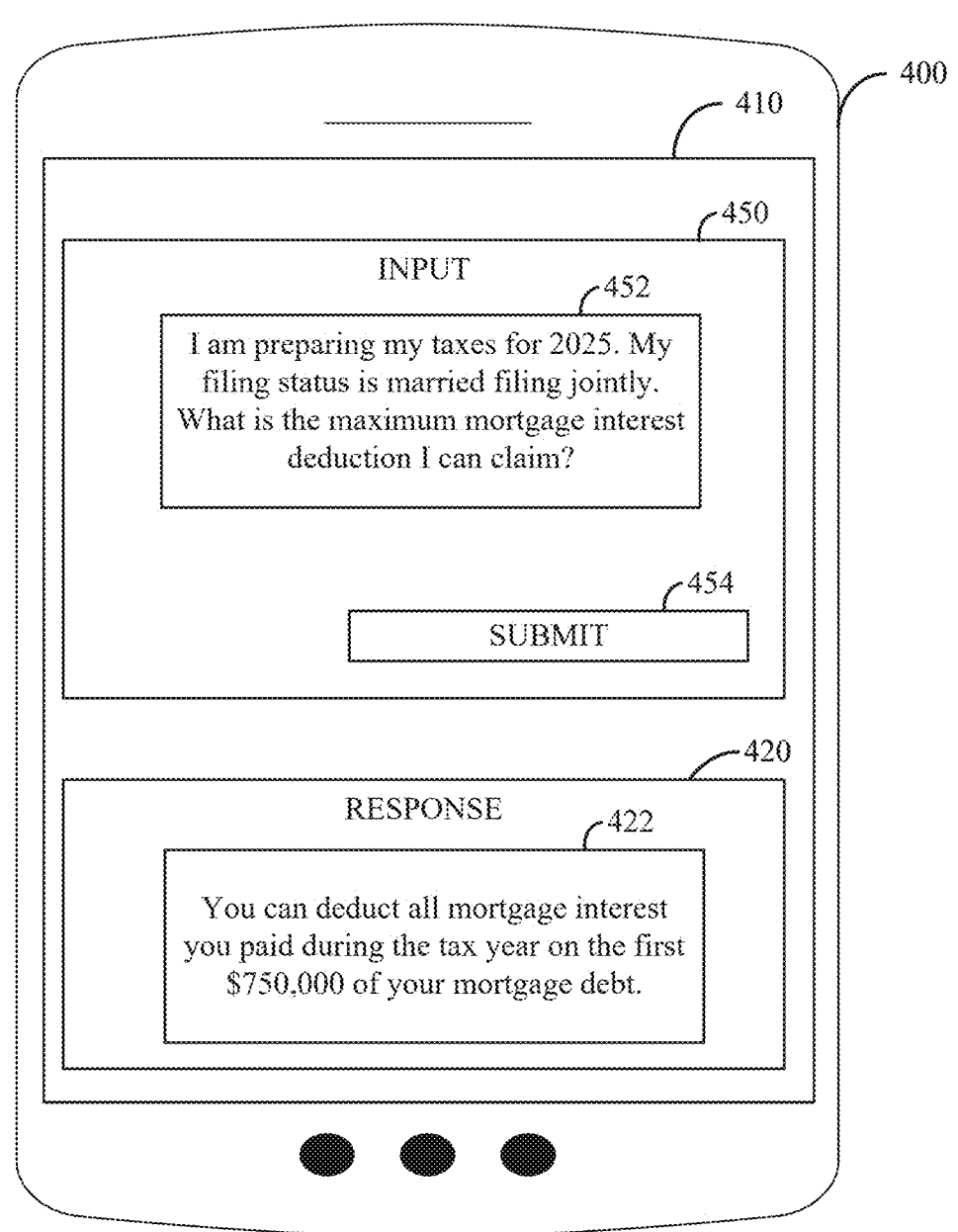
FIG. 4 illustrates an example user interface screen related to reducing latency in generating responses using an LLM, according to aspects of the present disclosure.

FIG. 4 illustrates example user interface screen 410, displayed on a device 400, related to reducing latency in generating responses using an LLM, according to aspects of the present disclosure. For example, user interface screen 410 may represent an example screen of user interface 122 of FIG. 1, and device 400 may represent an example of client 120 of FIG. 1.

Example user interface screen 410 shows how a user may interact with a language processing system. The user interface screen 410 displays two main sections: an input section 450 and a response section 420.

In the input section 450, block 452 contains a text field where the user enters a query, such as "I am preparing my taxes for 2025. My filing status is married filing jointly. What is the maximum mortgage interest deduction I can claim?" This text in block 452 may represent input text 124 of FIG. 1, and may be incrementally processed by the system as the user types. For instance, the text in block 452 may be segmented (as the text is entered) into separate sentences such as a first sentence "I am preparing my taxes for 2025.", a second sentence "My filing status is married filing jointly.", and a third sentence "What is the maximum mortgage interest deduction I can claim?".

When the first sentence ("I am preparing my taxes for 2025.") is detected (e.g., before the second sentence has been entered and/or detected), the first sentence may be processed through an encoder portion of language processing machine learning model 116 of FIG. 1 to produce an embedding of the first sentence (without processing that embedding though a decoder portion of the model). That embedding may be used as the cumulative context vector up to that point.

When the second sentence ("My filing status is married filing jointly.") is detected (e.g., before the third sentence has been entered and/or detected), the second sentence may be processed through the encoder portion of language processing machine learning model 116 of FIG. 1 to produce an embedding of the second sentence (without processing that embedding though the decoder portion of the model). The embedding of the second sentence may be provided along with the embedding of the first sentence (which is the cumulative context vector up to that point) to merging machine learning model 118 of FIG. 1, and merging machine learning model 118 may output a cumulative context vector representing a merged representation of those two inputs.

When the third sentence ("What is the maximum mortgage interest deduction I can claim?") is detected, the third sentence may be processed through the encoder portion of language processing machine learning model 116 of FIG. 1 to produce an embedding of the third sentence (without processing that embedding though the decoder portion of the model). The embedding of the third sentence may be provided along with the most recent cumulative context vector (generated by merging machine learning model 118 of FIG. 1 based on the embedding of the first sentence and the embedding of the second sentence, as described above in the previous paragraph) to merging machine learning model 118 of FIG. 1, and merging machine learning model 118 may output a cumulative context vector representing a merged representation of those two inputs.

It may be determined that the third sentence is the final sentence, such as based on one or more conditions. For example, the user may select user interface control 454 in order to submit the query, and this selection may be a condition that indicates that the input text is complete and that the third sentence is therefore the final sentence. When the final sentence is detected, the engine may generate a response by injecting the final cumulative context vector (generated by merging machine learning model 118 of FIG. 1 based on the embedding of the third sentence and the prior cumulative context vector, as described above in the previous paragraph) into the decoder portion of language processing machine learning model 116 of FIG. 1 and receiving the response as an output from language processing machine learning model 116.

The response section 420 displays the system's generated response in block 422, such as "You can deduct all mortgage interest you paid during the tax year on the first $750,000 of your mortgage debt." This response is generated based on the user's input text using the dynamic response engine in a manner that improves efficiency and reduces latency through incremental encoding as described above, reflecting the system's ability to deliver accurate and contextually relevant information with reduced latency.

The user may provide feedback with respect to the response, such as by selecting one or more user interface controls, performing one or more actions, providing a subsequent input query indicating whether the response is correct or incorrect, and/or the like. Such feedback may be used to retrain one or more machine learning models described herein for improved accuracy of subsequently generated responses to subsequently entered input text.

Example Operations Related to Reducing Latency in Generating Responses Using an LLM FIG. 5 illustrates a flowchart of operations 500 for reducing latency in generating responses using an LLM, according to aspects of the present disclosure. For example, operations 500 may be performed by one or more components described herein, such as dynamic response engine 112 of FIG. 1 and/or one or more components of FIG. 6A and/or 6B described below.

Operations 500 may begin at step 502, with applying a sentence boundary detection technique to an input buffer in order to identify a first sentence in a stream of input text while the stream of input text is being input to the input buffer via a user interface.

In some aspects, the applying of the sentence boundary detection technique comprises monitoring the input buffer for sentence boundary indicators. In certain aspects, the applying of the sentence boundary detection technique comprises using a classification machine learning model trained to identify sentence boundaries in input sentences.

Operations 500 may continue at step 504, with performing a forward pass through an encoder portion of a large language model (LLM) to generate a first embedding of the first sentence. In some aspects, the encoder portion may process the detected sentence and output a numerical representation capturing its semantic and syntactic features.

Operations 500 may continue at step 506, with determining that a final sentence has been entered in the stream of input text. This determination may be based on one or more user actions, such as selecting a submit control, pressing an enter key, or other configured conditions.

Operations 500 may continue at step 508, with performing an additional forward pass through the encoder portion of the LLM to generate a second embedding of the final sentence. The final sentence may be processed in a manner similar to previous sentences, producing its corresponding embedding.

Operations 500 may continue at step 510, with generating a cumulative context vector using a merging machine learning model based on the first embedding and the second embedding. In some aspects, the merging machine learning model is a lightweight neural network selected from: a multi-layer perceptron (MLP); or a gated recurrent unit (GRU).

In certain aspects, the merging machine learning model was trained through a supervised learning process involving the merging machine learning model and the LLM.

In some aspects, the cumulative context vector is stored in a fast-access memory for efficient retrieval during subsequent processing steps.

Certain aspects further comprise updating the cumulative context vector incrementally using the merging machine learning model as each additional sentence is detected in the stream of input text.

Some aspects further comprise regenerating one or more embeddings and generating an updated cumulative context vector based on the regenerated one or more embeddings in response to user edits of one or more previously entered sentences Operations 500 may continue at step 512, with injecting the cumulative context vector into a decoder portion of the LLM, bypassing redundant re-encoding of the first sentence and the final sentence. In some aspects, the decoder portion may receive the cumulative context vector and generate a response based on the cumulative context vector.

In some aspects, the LLM is configured to receive the cumulative context vector at an intermediate layer, thereby eliminating redundant computation in earlier encoder layers.

Figure 6A:
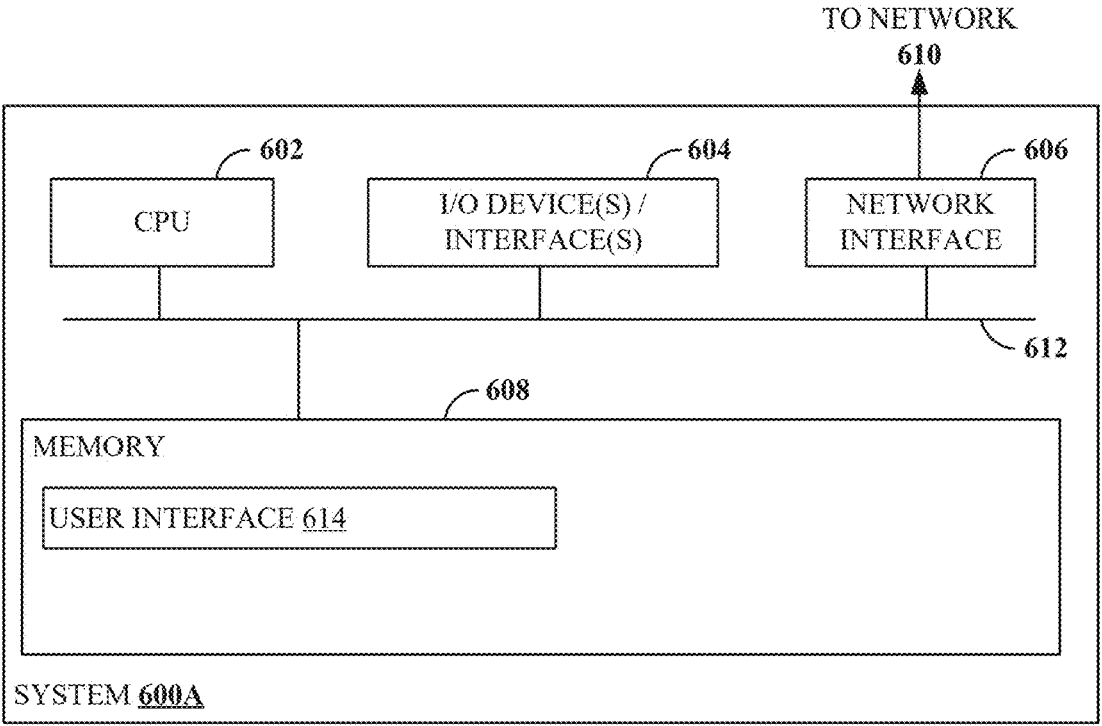
FIG. 6A and FIG. 6B illustrate block diagrams of two computing systems related to reducing latency in generating responses using an LLM, according to aspects of the present disclosure.

Operations 500 may continue at step 514, with receiving a response to the stream of input text as an output from the LLM based on the cumulative context vector. In some aspects, the response generated by the LLM may be displayed via the user interface, such as in real time, providing the user with efficient and contextually relevant information with reduced latency as opposed to prior techniques.
Example Processing Systems FIG. 6A illustrates an example system 600A with which embodiments of the present disclosure may be implemented. For example, system 600A may be configured to perform aspects of operations 500 of FIG. 5. In one example system 600A corresponds to client 120 of FIG. 1.

System 600A includes a central processing unit (CPU) 602, one or more I/O device interfaces 604 that may allow for the connection of various I/O devices (e.g., keyboards, displays, mouse devices, pen input, etc.) to the system 600A, network interface 606, a memory 608, and an interconnect 612. It is contemplated that one or more components of system 600A may be located remotely and accessed via a network 610. It is further contemplated that one or more components of system 600A may comprise physical components or virtualized components.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, and memory 608. CPU 602 is included to be representative of a single CPU, multiple CPUs, a single CPU having multiple processing cores, and other arrangements.

Additionally, the memory 608 is included to be representative of a random access memory or the like. In some embodiments, memory 608 may comprise a disk drive, solid state drive, or a collection of storage devices distributed across multiple storage systems. Although shown as a single unit, the memory 608 may be a combination of fixed and/or removable storage devices, such as fixed disc drives, removable memory cards or optical storage, network attached storage (NAS), or a storage area-network (SAN).

As shown, memory 608 includes a user interface 614, which may be representative of user interface 122 of FIG. 1. For example, a user may interact with user interface 614 to provide input text, submit input text, receive responses, provide feedback with respect to responses, perform other actions based on or in connection with input text and/or responses, and/or the like.

Figure 6B:
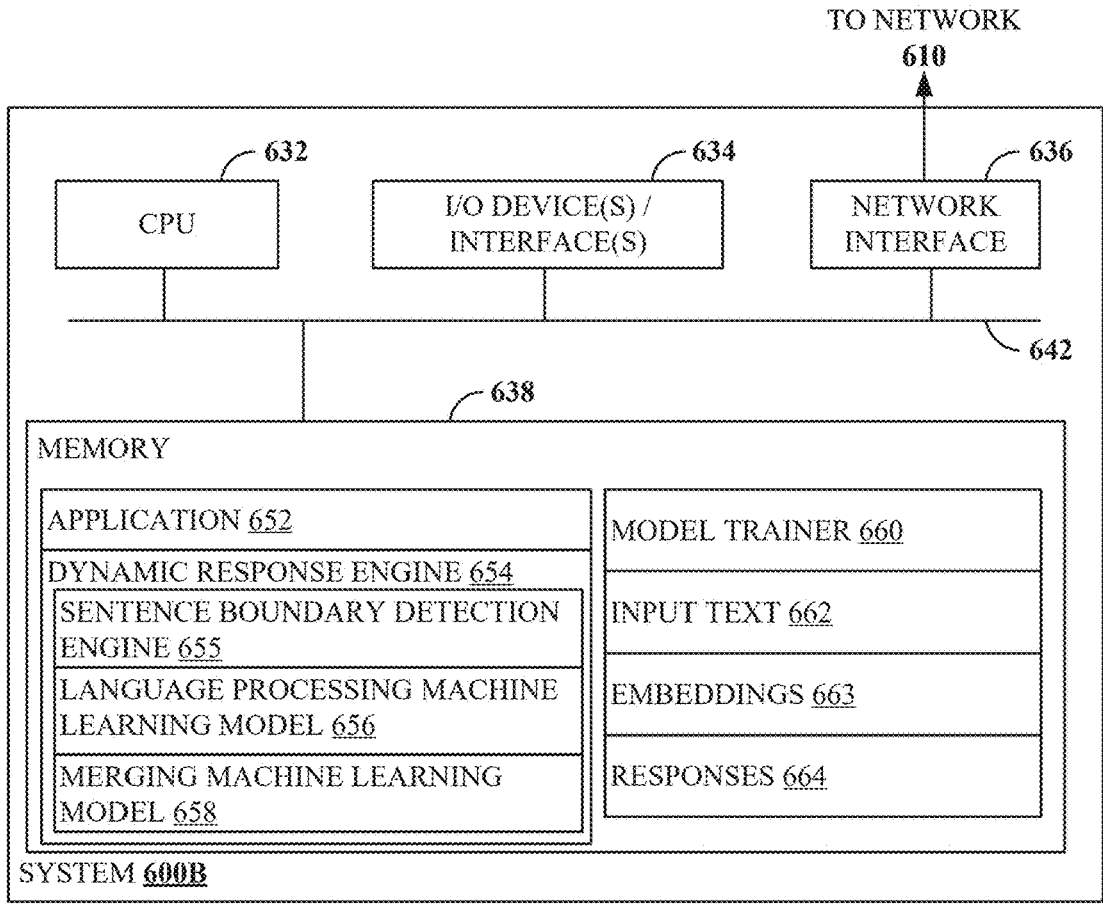

FIG. 6B illustrates another example system 600B with which embodiments of the present disclosure may be implemented. For example, system 600B may correspond to server 110 of FIG. 1, and may be configured to perform aspects of operations 500 of FIG. 5.

System 600B includes a CPU 632, one or more I/O device interfaces 634 that may allow for the connection of various I/O devices (e.g., keyboards, displays, mouse devices, pen input, etc.) to the system 600B, network interface 636, a memory 638, and an interconnect 642. It is contemplated that one or more components of system 600B may be located remotely and accessed via a network 610. It is further contemplated that one or more components of system 600B may comprise physical components or virtualized components.

CPU 632 may retrieve and execute programming instructions stored in the memory 638. Similarly, the CPU 632 may retrieve and store application data residing in the memory 638. The interconnect 642 transmits programming instructions and application data, among the CPU 632, I/O device interface 634, network interface 636, and memory 638. CPU 632 is included to be representative of a single CPU, multiple CPUs, a single CPU having multiple processing cores, and other arrangements.

Additionally, the memory 638 is included to be representative of a random access memory or the like. In some embodiments, memory 638 may comprise a disk drive, solid state drive, or a collection of storage devices distributed across multiple storage systems. Although shown as a single unit, the memory 638 may be a combination of fixed and/or removable storage devices, such as fixed disc drives, removable memory cards or optical storage, network attached storage (NAS), or a storage area-network (SAN).

As shown, memory 638 includes an application 652, which may be representative of a computing application that performs language processing functionality, such as an application that includes an AI-assisted conversational system, a chat bot, or the like. In some aspects, user interface 614 of FIG. 6A provides user interface screens corresponding to application 652.

As shown, memory 638 further includes dynamic response engine 654, sentence boundary detection engine 655, language processing machine learning model 656, and merging machine learning model 658, which may be representative of dynamic response engine 112, sentence boundary detection engine 114, language processing machine learning model 116, and merging machine learning model 118 of FIG. 1. In some aspects, dynamic response engine 654 may be part of application 652, or may be separate from application 652.

Memory 638 further includes a model trainer 660, which may perform operations related to training and/or fine-tuning one or more machine learning models such as language processing machine learning model 656, merging machine learning model 658, a classifier used by sentence boundary detection engine 655, and/or the like. In other aspects, model trainer 660 may be located and executed on a separate system from the system on which such machine learning model(s) are run for use in dynamic response generation.

Memory 638 further includes input text 662, which may be representative of input text 124 of FIG. 1. Memory 638 further includes embeddings 663, which may be representative of embeddings 320 and/or cumulative embedding(s) 322 of FIG. 1. Memory 638 further includes responses 664, which may include response 126 of FIG. 1.

It is noted that systems 600A and 600B are included as examples, and certain functionality described with respect to systems 600A and/or 600B and/or otherwise described herein may be implemented via more or fewer devices and/or components.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system for reducing latency in generating responses using a large language model (LLM), comprising:
   one or more processors; and
   a non-transitory computer readable medium storing instructions that, when executed by the one or more processors, cause the system to:
      apply a sentence boundary detection technique to an input buffer in order to identify a first sentence in a stream of input text while the stream of input text is being input to the input buffer via a user interface;
      perform a forward pass through an encoder portion of the LLM to generate a first embedding of the first sentence;
      determine that a final sentence has been entered in the stream of input text;
      perform an additional forward pass through the encoder portion of the LLM to generate a second embedding of the final sentence;
      generate a cumulative context vector using a merging machine learning model based on the first embedding and the second embedding; and
      inject the cumulative context vector into a decoder portion of the LLM, bypassing redundant re-encoding of the first sentence and the final sentence; and
      receive a response to the stream of input text as an output from the LLM based on the cumulative context vector.

2. The system of claim 1, wherein the applying of the sentence boundary detection technique comprises monitoring the input buffer for sentence boundary indicators.

3. The system of claim 1, wherein the applying of the sentence boundary detection technique comprises using a classification machine learning model trained to identify sentence boundaries in input sentences.

4. The system of claim 1, wherein the merging machine learning model is a lightweight neural network selected from:
   a multi-layer perceptron (MLP); or
   a gated recurrent unit (GRU).

5. The system of claim 4, wherein the merging machine learning model was trained through a supervised learning process involving the merging machine learning model and the LLM.

6. The system of claim 1, wherein the cumulative context vector is stored in a fast-access memory for efficient retrieval during subsequent processing steps.

7. The system of claim 1, wherein the instructions, when executed by the one or more processors, further cause the system to update the cumulative context vector incrementally using the merging machine learning model as each additional sentence is detected in the stream of input text.

8. The system of claim 1, wherein the LLM is configured to receive the cumulative context vector at an intermediate layer, thereby eliminating redundant computation in earlier encoder layers.

9. The system of claim 1, wherein the instructions, when executed by the one or more processors, further cause the system to regenerate one or more embeddings and generate an updated cumulative context vector based on the regenerated one or more embeddings in response to user edits of one or more previously entered sentences.

10. The system of claim 1, wherein the response generated by the LLM is displayed via the user interface.

11. A method for reducing latency in generating responses using a large language model (LLM), comprising:

applying a sentence boundary detection technique to an input buffer in order to identify a first sentence in a stream of input text while the stream of input text is being input to the input buffer via a user interface;

performing a forward pass through an encoder portion of the LLM to generate a first embedding of the first sentence;

determining that a final sentence has been entered in the stream of input text;

performing an additional forward pass through the encoder portion of the LLM to generate a second embedding of the final sentence;

generating a cumulative context vector using a merging machine learning model based on the first embedding and the second embedding; and injecting the cumulative context vector into a decoder portion of the LLM, bypassing redundant re-encoding of the first sentence and the final sentence; and receiving a response to the stream of input text as an output from the LLM based on the cumulative context vector.

12. The method of claim 11, wherein the applying of the sentence boundary detection technique comprises monitoring the input buffer for sentence boundary indicators.

13. The method of claim 11, wherein the applying of the sentence boundary detection technique comprises using a classification machine learning model trained to identify sentence boundaries in input sentences.

14. The method of claim 11, wherein the merging machine learning model is a lightweight neural network selected from:

a multi-layer perceptron (MLP); or a gated recurrent unit (GRU).

15. The method of claim 14, wherein the merging machine learning model was trained through a supervised learning process involving the merging machine learning model and the LLM.

16. The method of claim 11, wherein the cumulative context vector is stored in a fast-access memory for efficient retrieval during subsequent processing steps.

17. The method of claim 11, further comprising updating the cumulative context vector incrementally using the merging machine learning model as each additional sentence is detected in the stream of input text.

18. The method of claim 11, wherein the LLM is configured to receive the cumulative context vector at an intermediate layer, thereby eliminating redundant computation in earlier encoder layers.

19. The method of claim 11, further comprising regenerating one or more embeddings and generate an updated cumulative context vector based on the regenerated one or more embeddings in response to user edits of one or more previously entered sentences.

20. A non-transitory computer readable medium comprising instructions that, when executed by one or more processors of a computing system, cause the computing system to:

apply a sentence boundary detection technique to an input buffer in order to identify a first sentence in a stream of input text while the stream of input text is being input to the input buffer via a user interface;

perform a forward pass through an encoder portion of a large language model (LLM) to generate a first embedding of the first sentence;

determine that a final sentence has been entered in the stream of input text;

perform an additional forward pass through the encoder portion of the LLM to generate a second embedding of the final sentence;

generate a cumulative context vector using a merging machine learning model based on the first embedding and the second embedding; and inject the cumulative context vector into a decoder portion of the LLM, bypassing redundant re-encoding of the first sentence and the final sentence; and receive a response to the stream of input text as an output from the LLM based on the cumulative context vector.

\* \* \* \* \*